(12) United States Patent
Besemer et al.

(10) Patent No.: US 8,227,396 B2
(45) Date of Patent: Jul. 24, 2012

(54) METHOD FOR CLEANING PROCESSING EQUIPMENT SELECTED FROM THE GROUP CONSISTING OF FILTERS

(75) Inventors: Arie Cornelis Besemer, Amerongen (NL); Elmar Van Mastrigt, Almelo (NL); André Mepschen, Oosterhesselen (NL)

(73) Assignee: X-Flow B.V., Enschede (NL)

( * ) Notice: Subject to any disclaimer, the term of this patent is extended or adjusted under 35 U.S.C. 154(b) by 0 days.

(21) Appl. No.: 12/652,893

(22) Filed: Jan. 6, 2010

(65) Prior Publication Data

US 2010/0204077 A1   Aug. 12, 2010

Related U.S. Application Data

(63) Continuation of application No. PCT/NL2008/050488, filed on Jul. 16, 2008.

(30) Foreign Application Priority Data

Jul. 31, 2007 (NL) ..................................... 2000790
Jul. 31, 2007 (NL) ..................................... 2000791

(51) Int. Cl.
*C11D 3/395* (2006.01)
*C11D 7/06* (2006.01)

(52) U.S. Cl. ........ 510/218; 510/162; 510/207; 510/253; 510/375; 210/355; 210/391; 210/393; 210/758; 210/759; 210/765; 210/785; 210/793; 210/798

(58) Field of Classification Search .................. 510/218, 510/162, 207, 253, 375; 210/391, 393, 758, 210/759, 765, 785, 793, 798, 355
See application file for complete search history.

(56) References Cited

U.S. PATENT DOCUMENTS

| 5,441,665 | A | 8/1995 | Massaioli | |
|---|---|---|---|---|
| 6,409,926 | B1 * | 6/2002 | Martin | 210/709 |
| 2002/0063088 | A1 * | 5/2002 | Hidaka et al. | 210/263 |
| 2002/0099759 | A1 * | 7/2002 | Gootherts | 709/105 |
| 2006/0237038 | A1 * | 10/2006 | Jetten et al. | 134/22.1 |
| 2008/0245738 | A1 * | 10/2008 | Coulter | 210/650 |

FOREIGN PATENT DOCUMENTS

| DE | 19503060 | 8/1996 |
|---|---|---|
| EP | 0456272 | 11/1991 |
| GB | 2169308 | 7/1986 |

\* cited by examiner

*Primary Examiner* — Charles Boyer
(74) *Attorney, Agent, or Firm* — Jeffrey D. Myers; Isaac Estrada; Peacock Myers, P.C.

(57) ABSTRACT

A method for cleaning process apparatus used for production of liquids, especially for cleaning filters, for example membrane filters. The apparatus is contacted with a solution of peroxydisulphate. It is especially preferred that the cleaning process is carried out at a temperature between 15 and 95° C.

6 Claims, No Drawings

METHOD FOR CLEANING PROCESSING EQUIPMENT SELECTED FROM THE GROUP CONSISTING OF FILTERS

CROSS-REFERENCE TO RELATED APPLICATIONS

This application is a continuation application of International Patent Cooperation Treaty (PCT) Application Ser. No. PCT/NL2008/050488, entitled "A Method for Cleaning Processing Equipment, Such as Filters", to X-Flow B.V., filed on Jul. 16, 2008, which is a continuation application of Netherlands Patent Application Serial No. NL 2000790, to X-Flow B.V., filed on Jul. 31, 2007, and Netherlands Patent Application Serial No. NL 2000791, to X-Flow B.V., filed on Jul. 31, 2007, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention

The invention relates to a method according to the preamble of claim 1. The invention especially relates to a method of cleaning processing equipment, in particular filters, such as membrane filters, which are used for producing liquid foodstuffs such as milk (or milk products), fruit juices, beer, soft drinks (such as lemonades), cider, wine, sherry, port, distilled drinks and the like.

2. Description of Related Art

In the food industry and sewage purification plants, use is being made to an increasing extent of membrane filters, in particular polymeric membranes such as, polysulphone, polyethersulphone (with or without polyvinylpyrrolidone) and certain types of polyamides, and ceramic membranes for removing insoluble matter from beverages and other liquids. Such membranes ensure an expedient removal of undesirable constituents, in particular micro-organisms such as algae, fungi, yeast, and bacteria (exudates).

However, the permeability of such membrane filters, also expressed as flux, decreases in the course of time and the membranes may become blocked even after a relatively short time, i.e. sometimes even within less than one hour, because components from the material to be treated are adsorbed or absorbed or precipitated on surfaces of the apparatus, which is undesirable. The consequence is that the process has to be stopped in order to clean the membranes. The blocked filters can be restored, for example by rinsing them through in the opposite direction, a process known as back-flushing. This can be seen as a mechanical solution. However, that is a complicated process and is only a temporary and not satisfactory solution, since after each step the initial flux (at the same trans membrane pressure) is lower than before and on long term the contamination accumulates to such an extent that the filter is completely blocked. Moreover, it is difficult to remove some persistent organic contaminants in this way.

BRIEF SUMMARY OF THE INVENTION

The invention is without limitation directed to the cleaning of filters that are used for generally known processes, like the filtration of soft drinks, milk (products), wine, sherry, port, distilled drinks, fruit juices, lemonades, beer, such as settled beer, residual beer, but also the wort/spent grain separation, hot trub separation and cold trub separation.

In the case of brewing beer the invention relates to, inter alia, the apparatus used during the preparation of malt, the conversion of malt and/or unmalted grain into wort and the further processing of the wort, with or without addition of extra components, such as hops, by fermentation to beer, as well as all auxiliary apparatus used therewith and coming in contact with main or secondary streams from these processes.

There is therefore a need for an efficient cleaning system for cleaning apparatus for the production, as defined above, of liquid foodstuffs, which system is capable of providing a proper cleaning, which must preferably be performed within a relatively short time (preferably in less than 120 minutes) and during which substantially all contaminations are removed.

A further examination has revealed that the apparatus, and more in particular the filters, during the production become contaminated by a combination of all kinds of compounds, of which polysaccharides, oligosaccharides, proteins, β-glucans, fats and polyphenols are important components.

Enzymatic processes have been proposed for cleaning membranes. Thus, the international patent application WO 98/45029 describes the use of cellulases and amylases for cleaning beer filtering membranes, after alkaline pre-treatment of the membrane. Similarly, the Japanese patent application JP-A 4-267933 describes the use of proteases and cellulases for cleaning separation membranes.

These non-oxidative processes, however, are usually not completely satisfactory because appreciable reaction times appear to be necessary to achieve an effective removal of said components.

The international patent application WO 97/45523 describes the use of 2,2,6,6-tetramethylpiperidine-N-oxyl (TEMPO) as nitroxyl compound and hypochlorite or hypobromite as a reoxidizing agent for cleaning beer-settling modules. However, the presence of halogen residues, especially bromine residues, is highly undesired in equipment because of their corrosive character.

The international patent application WO 03/060052 describes a process in which filters can be cleaned in a bromine-free process by using a cyclic nitroxyl compound, such as TEMPO or its 4-acetamido or 4-acetoxy derivative and a halogen-free oxidizing system. The nitroxyl compound can be oxidized to the corresponding ion by enzymatic means with oxygen or hydrogen peroxide as co-substrate or by metal catalyzed oxidation in combination with peracids, such as peracetic acid, persulphuric acid (Caro's acid), permanganic acid or hydroperoxide.

Also, other oxidative methods are described. The international patent application WO 2006/012691 describes the generation of hydroxyl radicals to clean the membranes. This method is in particular suitable when the membranes are of the fluorinated polymer type and hence are highly inert towards chemical reagents.

The international patent application WO 03/095078 describes a method that also is based upon oxidation, which seems to be very effective when back flushing is applied, aimed to convert the polyphenols. This method is based upon the assumption that polyphenols adhere at first to the membrane surface and are responsible for the initiation of the fouling layer. However, from the data presented it appears that from the oxidation chemicals claimed, only hydrogen peroxide with a manganese catalyst is effective.

DESCRIPTION OF THE INVENTION

According to the present invention the method is performed by using peroxydisulphate. In its broadest aspect, the invention relates to a method for cleaning processing equipment, said method being characterized in that it comprises the step of contacting the equipment with a solution of a peroxydisulphate. The invention is based on the surprising effect that it is possible to adequately clean apparatus, for example filtration membranes and process equipment, used during the production of foodstuffs and clean water by exposing the fouled apparatus to a solution containing peroxydisulphate. The preferred material is sodium peroxydisulphate ($Na_2S_2O_8$).

DETAILED DESCRIPTION OF THE INVENTION

Further preferred embodiments follow from the disclosure and from the remaining claims.

Peroxydisulphate is known to generate radicals and therefore it is expected that oxidation of organic substrates is a non-selective process.

The main constituents of beer are poly- and oligosaccharides, proteins and polyphenols.

A typical condition is an elevated temperature that makes it possible to perform a cleaning step within a relatively short time (<60 minutes). The concentration of sodium peroxydisulphate to be used is preferably between 200 and 3000 ppm, typically between 500 and 2500 ppm, more preferably between 500 and 2000 ppm. The consumption of the reagent can be monitored through iodometric titration and the amount of reagent to be added can be based on this monitoring.

The membrane is after treatment completely restored and no further treatment with chemicals is necessary.

Despite the relatively high pH and high temperature the membranes appear to be stable. The terms "relatively high" and "high" relate to values that are known to a person skilled in the art at which membranes may deteriorate.

The process of the invention may be used for cleaning membrane filters used in food and feed industry and for water purification. Production of dairy products, beer, wine, fruit juices (apple, pine apple, grape fruit, oranges), vegetable juices and other beverages. The equipment includes pipes, tubes, mixing devices. The filter type may be of any type including those which are made of PVP, polysulphone, polyether-sulphone and especially polyamides and ceramic membranes.

The process of the invention may proceed by oxidation affording a better solubilization and/or degradation of polysaccharides and proteins. The process can be conducted as a static (batch-wise) process. The time needed for cleaning is preferably between 5 minutes and 120 minutes.

Also a continuous or semi-continuous process is possible, where the liquid is circulated through the system. After cleaning the chemical aid can be removed by rinsing with a suitable liquid, which is preferably water.

The peroxydisulphate compound, for example a sodium peroxydisulphate may preferably be provided as a soluble salt of peroxydisulphate, such as a sodium, potassium or ammonium salt. The pH should be alkaline, preferably at pH>7, more preferably pH>9, still more preferably pH>11. Generally, there seems to be no explicit preference for any of these cations. If sodium perdisulphate is used, a suitable concentration is in the range as indicated above.

EXAMPLES

General

The membranes used are of the hollow-fibre type, made of polyethersulphone/PVP-type; 20 fibres with a length of 300 mm are enclosed in a module, having a surface-area of 0.0235 $m^2$. Beer is pumped through the fibres at a starting pressure of 1 bar.

1. Standard fouling procedure for membranes.

Beer with a temperature of 0 (±1) ° C. is filtered through the membranes at a constant flux of 107 $1 \cdot m^{-2} \cdot hr^{-1} \cdot bar^{-1}$ under cross flow conditions (speed 2 m/s). The procedure is continued until the trans membrane pressure is higher than 1.6 bar (usually this takes 4 hours). After fouling, the clean water flux is 7500-15000 $1 \cdot m^{-2} \cdot hr^{-1} \cdot bar^{-1}$.

2. Washing steps before and/or after the oxidative cleaning step (for example peroxydisulphate) may comprise one or more of the following procedures:

a. A back water flush consisting of the following steps: back flush with reversed osmosis water during 20 seconds, followed by flushing with 0.01 M NaOH solution during 180 seconds, and finally with RO water 140 seconds b. Alkali treatment, performed with a NaOH-solution at pH 12 and 60° C.

c. Acid treatment, performed with nitric acid at pH 2 during 10 minutes at room temperature d. (alternative) oxidative treatment is performed with hydrogen peroxide and NaOH.

The flux of a never-used membrane module is 50,000-55,000 $1 \cdot m^{-2} \cdot hr^{-1} \cdot bar^{-1}$.

Hereinafter examples of the invention will be given, without limiting the scope thereof. The determination of the clean water flux in each Example, at the same time also forms a clean water wash step. The pH value in the Examples 1, 2 and 4 is between pH 11 and 13.

Example 1-4

Cleaning with Peroxydisulphate/Sodium Hydroxide

A fouled membrane is cleaned by a back-flush as described above. Then through the module a solution containing peroxydisulphate and sodium hydroxide is circulated during 45 minutes. The temperature of the solution is maintained at elevated temperature. (see for further experimental details Table 1). After this procedure the module is removed and washed with an alkaline solution.

The concentration of sodium peroxydisulphate used in the experiments is 1500 ppm (6.3 mM), added as a solution of peroxydisulphate and sodium hydroxide (final concentration of 6.3 mM and 0.1 M, respectively).

The results of the experiments are given in Table 1.

TABLE 1

Results of cleaning of fouled membranes with sodium peroxydisulphate and sodium hydroxide.

| Example | T (°C.) | Flux[1] (clean) | Flux[1] (BW)[2] | Flux[1] (alkali)[3] | Flux[1] (peroxy-disulphate)[4] | Flux[1] (acid) |
|---|---|---|---|---|---|---|
| 1 | 70 | 54600 | 5400 | 17900 | 45800 | n.a. |
| 2 | 80 | 49100 | 7300 | 12100 | 44800 | n.a. |
| 3 | 70 | 52000 | n.m. | 2000 | 31000 | 31000 |
| 4 | 70 | 52000 | 2700 | 11000 | 35800 | 36600 |

[1] $l \cdot m^{-2} \cdot hr^{-1} \cdot bar^{-1}$
[2] Back wash
[3] Wash with sodium hydroxide
[4] n.m. = too low to measure; n.a. = not applied.

What is claimed is:

1. A method for cleaning processing equipment comprising:
   providing a solution of a peroxydisulphate and alkali hydroxide at an elevated temperature of about 70° C. or above, wherein the solution has a pH greater than 11; and back-flushing the solution though the processing equipment, wherein the processing equipment is a filter used in any of
   (a) food and feed industry or
   (b) water purification.

2. A method according to claim 1, wherein the cleaning process is carried out at temperature between 70 and 95° C.

3. A method according to claim 1, wherein the peroxydisulphate compound is used at a concentration between 0.0005-2 moles/liter.

4. A method according to claim 1, wherein the peroxydisulphate compound is a sodium salt or potassium salt of peroxydisulphate.

5. A method according to any of the preceding claims, wherein said processing equipment is a membrane filter.

6. A method according to claim 1, wherein said filter is made of a material selected from the group consisting of PVP, polysulphone, polyether-sulphone, polyamides or ceramic materials.

* * * * *